(12) United States Patent
Baruch et al.

(10) Patent No.: US 11,941,253 B2
(45) Date of Patent: Mar. 26, 2024

(54) STORAGE SYSTEM AND METHOD USING PERSISTENT MEMORY

(71) Applicant: EMC IP Holding Company, LLC, Hopkinton, MA (US)

(72) Inventors: Oran Baruch, Tel Aviv (IL); Ronen Gazit, Tel Aviv (IL); Jenny Derzhavetz, Ra'anana (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 435 days.

(21) Appl. No.: 17/237,560

(22) Filed: Apr. 22, 2021

(65) Prior Publication Data

US 2022/0342562 A1 Oct. 27, 2022

(51) Int. Cl.
*G06F 12/00* (2006.01)
*G06F 3/06* (2006.01)

(52) U.S. Cl.
CPC .......... *G06F 3/0619* (2013.01); *G06F 3/0653* (2013.01); *G06F 3/0673* (2013.01)

(58) Field of Classification Search
CPC ..... G06F 3/0619; G06F 3/0653; G06F 3/0673
USPC ......................................................... 711/154
See application file for complete search history.

(56) References Cited

U.S. PATENT DOCUMENTS

| | | | | |
|---|---|---|---|---|
| 8,171,032 B2 * | 5/2012 | Herz | ................... | G06Q 30/0207 707/748 |
| 8,301,832 B1 * | 10/2012 | Moore | ................... | G06F 3/0688 711/103 |
| 10,037,779 B1 * | 7/2018 | Mendonsa | ............ | G11B 21/08 |
| 10,095,545 B1 * | 10/2018 | Gupta | .................... | G06F 9/4881 |
| 10,229,051 B2 * | 3/2019 | Hwang | ................ | G06F 12/0246 |
| 10,379,943 B2 * | 8/2019 | Borlick | ................ | G06F 3/0659 |
| 11,275,527 B1 * | 3/2022 | Spector | ............... | G06F 13/1642 |
| 2001/0052088 A1 * | 12/2001 | Donhauser | ......... | G05B 19/0428 714/38.13 |
| 2004/0194107 A1 * | 9/2004 | Masuoka | ................ | G06F 9/542 718/100 |
| 2005/0066138 A1 * | 3/2005 | Horn | ..................... | G06F 9/4881 711/158 |
| 2006/0242313 A1 * | 10/2006 | Le | ........................... | H04L 67/02 709/230 |
| 2014/0080428 A1 * | 3/2014 | Rhoads | ................... | H04W 4/70 455/88 |
| 2014/0244907 A1 * | 8/2014 | Watanabe | ............ | G06F 3/0613 711/103 |

(Continued)

*Primary Examiner* — Mohamed M Gebril
(74) *Attorney, Agent, or Firm* — Brian J. Colandreo; Heath M. Sargeant; Holland & Knight LLP

(57) ABSTRACT

A method, computer program product, and computing system for sensing a failure within a system within a computing device. The system may include a cache memory system and a vaulted memory comprising a random access memory (RAM) having a plurality of independent persistent areas. A primary node and secondary node may be provided. The primary node may occupy a first independent persistent area of the RAM of the vaulted memory. The secondary node may occupy a second independent persistent area of the RAM of the vaulted memory. Data within the vaulted memory may be written to a persistent media using an iterator. The data may include at least one dirty page. Writing data within the vaulted memory to the persistent media may include flushing the at least one dirty page to the persistent media.

18 Claims, 7 Drawing Sheets

(56) References Cited

U.S. PATENT DOCUMENTS

| | | | | |
|---|---|---|---|---|
| 2014/0310500 A1* | 10/2014 | Kaplan | .............. | G06F 9/30043 |
| | | | | 711/206 |
| 2014/0379984 A1* | 12/2014 | Chiu | .................... | G06F 3/0689 |
| | | | | 711/114 |
| 2016/0350015 A1* | 12/2016 | Luo | ..................... | G06F 12/0246 |
| 2016/0378499 A1* | 12/2016 | Burger | ................ | G06F 9/3806 |
| | | | | 712/234 |
| 2018/0024865 A1* | 1/2018 | Saga | ....................... | G06F 9/52 |
| | | | | 709/226 |
| 2019/0034364 A1* | 1/2019 | Lee | ....................... | G06F 13/42 |
| 2019/0102087 A1* | 4/2019 | Shi | ..................... | G06F 16/2358 |
| 2019/0121570 A1* | 4/2019 | Kim | ..................... | G06F 3/0688 |
| 2019/0278510 A1* | 9/2019 | Kaynak | ................ | G06F 3/0634 |
| 2019/0370066 A1* | 12/2019 | Ma | ...................... | G06F 11/3062 |
| 2019/0370247 A1* | 12/2019 | Eluri | .................... | G06F 3/0647 |
| 2019/0391761 A1* | 12/2019 | Brief | ..................... | G06F 3/0656 |
| 2020/0092178 A1* | 3/2020 | Nelson | ............ | G06Q 10/06316 |
| 2020/0301711 A1* | 9/2020 | Cuffney | ............... | G06F 9/3834 |
| 2020/0356280 A1* | 11/2020 | Sela | ...................... | G11C 11/409 |
| 2021/0034297 A1* | 2/2021 | Park | ................... | G06F 12/0246 |
| 2022/0342562 A1* | 10/2022 | Baruch | .............. | G06F 11/1471 |

* cited by examiner

STORAGE SYSTEM AND METHOD USING PERSISTENT MEMORY

BACKGROUND

Storing and safeguarding electronic content may be beneficial in modern business and elsewhere. Accordingly, various methodologies may be employed to protect and distribute such electronic content.

When it comes to efficiently storing data in light of a failure of a system (e.g., a restart, power disruption, etc.), writing data to a persistent media may be desirable in order back-up the data. A persistent media may utilize a non-volatile random-access memory (NVRAM) or a battery backup random access memory (RAM) in order to back-up the data. More specifically, and in regards to a modern storage cluster, a modern storage cluster may utilize volatile RAM along with data journaling to optimize a write operation latency. However, in this configuration, a node within the RAM may face several challenges, including, but not limited to, not being able to manage an independent cache associated with the RAM and requiring memory duplication and/or extra memory copy. Further, a cache associated with the RAM may not able to set its own policies on managing clean space within the cache associated with the RAM, which may lead to inefficiency issues.

SUMMARY OF DISCLOSURE

In one implementation, a computer-implemented method executed on a computing device may include, but is not limited to, sensing a failure within a system within a computing device. The system may include a cache memory system and a vaulted memory comprising a random access memory (RAM) having a plurality of independent persistent areas. A primary node and secondary node may be provided. The primary node may occupy a first independent persistent area of the RAM of the vaulted memory. The secondary node may occupy a second independent persistent area of the RAM of the vaulted memory. Data within the vaulted memory may be written to a persistent media using an iterator. The data may include at least one dirty page. Writing data within the vaulted memory to the persistent media may include flushing the at least one dirty page to the persistent media.

One or more of the following example features may be included. An initial address and size of the vaulted memory may be received from a platform. A plurality of components within the vaulted memory may be partitioned based upon, at least in part, the received initial address and size of the vaulted memory. Writing data within the vaulted memory to a persistent media using an iterator may include one or more of determining whether at least one of the plurality of components within the vaulted memory include a bitmap, in response to determining at least one of the plurality of components within the vaulted memory includes a bitmap, determining if the bitmap is associated with a dirty page, iterating, in response to determining a bitmap is associated with a dirty page, the dirty page, wherein iterating the dirty page includes returning a size and an address of the bitmap to the vaulted memory, and determining at least one of the plurality of components does not include a bitmap, and returning a size and address of the at least one component of the plurality of components to a beginning portion of the at least one component of the plurality of components. A primary node may be identified as an initiator node. The initiator node may receive a commit request via the primary node. The commit request may include a request to commit data within the vaulted memory to the persistent media. A dirty bitmap and a page descriptor may be transferred, via the primary node, to the secondary node. The dirty bitmap and page descriptor may be processed in response to transferring the dirty bitmap and page descriptor via the secondary node. The page descriptor may be removed. A new page descriptor may be allocated. The new page descriptor may be logged. A cache of the cache memory system may be updated. An update may be sent to the primary node via the secondary node in response to processing the dirty bitmap and page descriptor. The update may include the new page descriptor. The update may be logged with the new page descriptor in the primary node. The secondary node may be identified as an initiator node. The initiator node may receive a commit request via the secondary node. The commit request may include a request to commit data within the vaulted memory to the persistent media. A dirty bitmap and a page descriptor may be transferred, via the secondary node, to the primary node. The dirty bitmap and page descriptor may be processed in response to transferring the dirty bitmap and page descriptor via the primary node. Processing the dirty bitmap and page descriptor may include removing the page descriptor, allocating a new page descriptor, logging the new page descriptor with a data offset, and updating a cache of the cache memory system. The data offset may be an index of a remote node. An update may be sent to the secondary node via the primary node in response to processing the dirty bitmap and page descriptor. The update may include the new page descriptor. The update may be logged with the new page descriptor in the secondary node. Writing data within the vaulted memory to a persistent media using an iterator may not require use of non-volatile random access memory (NVRAM) that utilizes a data journal.

In another example implementation, a computer program product resides on a computer readable medium that has a plurality of instructions stored on it. When executed by a processor, the instructions cause the processor to perform operations that may include, but are not limited to, sensing a failure within a system within a computing device. The system may include a cache memory system and a vaulted memory comprising a random access memory (RAM) having a plurality of independent persistent areas. A primary node and secondary node may be provided. The primary node may occupy a first independent persistent area of the RAM of the vaulted memory. The secondary node may occupy a second independent persistent area of the RAM of the vaulted memory. Data within the vaulted memory may be written to a persistent media using an iterator. The data may include at least one dirty page. Writing data within the vaulted memory to the persistent media may include flushing the at least one dirty page to the persistent media.

One or more of the following example features may be included. An initial address and size of the vaulted memory may be received from a platform. A plurality of components within the vaulted memory may be partitioned based upon, at least in part, the received initial address and size of the vaulted memory. Writing data within the vaulted memory to a persistent media using an iterator may include one or more of determining whether at least one of the plurality of components within the vaulted memory include a bitmap, in response to determining at least one of the plurality of components within the vaulted memory includes a bitmap, determining if the bitmap is associated with a dirty page, iterating, in response to determining a bitmap is associated with a dirty page, the dirty page, wherein iterating the dirty page includes returning a size and an address of the bitmap to the vaulted memory, and determining at least one of the plurality of components does not include a bitmap, and returning a size and address of the at least one component of the plurality of components to a beginning portion of the at least one component of the plurality of components. A primary node may be identified as an initiator node. The initiator node may receive a commit request via the primary node. The commit request may include a request to commit data within the vaulted memory to the persistent media. A dirty bitmap and a page descriptor may be transferred, via the primary node, to the secondary node. The dirty bitmap and page descriptor may be processed in response to transferring the dirty bitmap and page descriptor via the secondary node. The page descriptor may be removed. A new page descriptor may be allocated. The new page descriptor may be logged. A cache of the cache memory system may be updated. An update may be sent to the primary node via the secondary node in response to processing the dirty bitmap and page descriptor. The update may include the new page descriptor. The update may be logged with the new page descriptor in the primary node. The secondary node may be identified as an initiator node. The initiator node may receive a commit request via the secondary node. The commit request may include a request to commit data within the vaulted memory to the persistent media. A dirty bitmap and a page descriptor may be transferred, via the secondary node, to the primary node. The dirty bitmap and page descriptor may be processed in response to transferring the dirty bitmap and page descriptor via the primary node. Process the dirty bitmap and page descriptor may include removing the page descriptor, allocating a new page descriptor, logging the new page descriptor with a data offset, and updating a cache of the cache memory system. The data offset may be an index of a remote node. An update may be sent to the secondary node via the primary node in response to processing the dirty bitmap and page descriptor. The update may include the new page descriptor. The update may be logged with the new page descriptor in the secondary node. Writing data within the vaulted memory to a persistent media using an iterator may not require use of non-volatile random access memory (NVRAM) that utilizes a data journal.

In another example implementation, a computing system includes a memory and a processor configured to sense a failure within a system within a computing device. The system may include a cache memory system and a vaulted memory comprising a random access memory (RAM) having a plurality of independent persistent areas. The processor may be further configured to provide a primary node and a secondary node. The primary node may occupy a first independent persistent area of the RAM of the vaulted memory and the secondary node may occupy a second independent persistent area of the RAM of the vaulted memory. The processor may be even further configured to write data within the vaulted memory to a persistent media using an iterator. The data may include at least one dirty page. Writing data within the vaulted memory to the persistent media may include flushing the at least one dirty page to the persistent media.

One or more of the following example features may be included. An initial address and size of the vaulted memory may be received from a platform. A plurality of components within the vaulted memory may be partitioned based upon, at least in part, the received initial address and size of the vaulted memory. Writing data within the vaulted memory to a persistent media using an iterator may include one or more of determining whether at least one of the plurality of components within the vaulted memory include a bitmap, in response to determining at least one of the plurality of components within the vaulted memory includes a bitmap, determining if the bitmap is associated with a dirty page, iterating, in response to determining a bitmap is associated with a dirty page, the dirty page, wherein iterating the dirty page may include returning a size and an address of the bitmap to the vaulted memory, and determining at least one of the plurality of components does not include a bitmap, and returning a size and address of the at least one component of the plurality of components to a beginning portion of the at least one component of the plurality of components. A primary node may be identified as an initiator node. The initiator node may receive a commit request via the primary node. The commit request may include a request to commit data within the vaulted memory to the persistent media. A dirty bitmap and a page descriptor may be transferred, via the primary node, to the secondary node. The dirty bitmap and page descriptor may be processed in response to transferring the dirty bitmap and page descriptor via the secondary node. The page descriptor may be removed. A new page descriptor may be allocated. The new page descriptor may be logged. A cache of the cache memory system may be updated. An update may be sent to the primary node via the secondary node in response to processing the dirty bitmap and page descriptor. The update may include the new page descriptor. The update may be logged with the new page descriptor in the primary node. The secondary node may be identified as an initiator node. The initiator node may receive a commit request via the secondary node. The commit request may include a request to commit data within the vaulted memory to the persistent media. A dirty bitmap and a page descriptor may be transferred, via the secondary node, to the primary node. The dirty bitmap and page descriptor may be processed in response to transferring the dirty bitmap and page descriptor via the primary node. Process the dirty bitmap and page descriptor may include removing the page descriptor, allocating a new page descriptor, logging the new page descriptor with a data offset, and updating a cache of the cache memory system. The data offset may be an index of a remote node. An update may be sent to the secondary node via the primary node in response to processing the dirty bitmap and page descriptor. The update may include the new page descriptor. The update may be logged with the new page descriptor in the secondary node. Writing data within the vaulted memory to a persistent media using an iterator may not require use of non-volatile random access memory (NVRAM) that utilizes a data journal.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
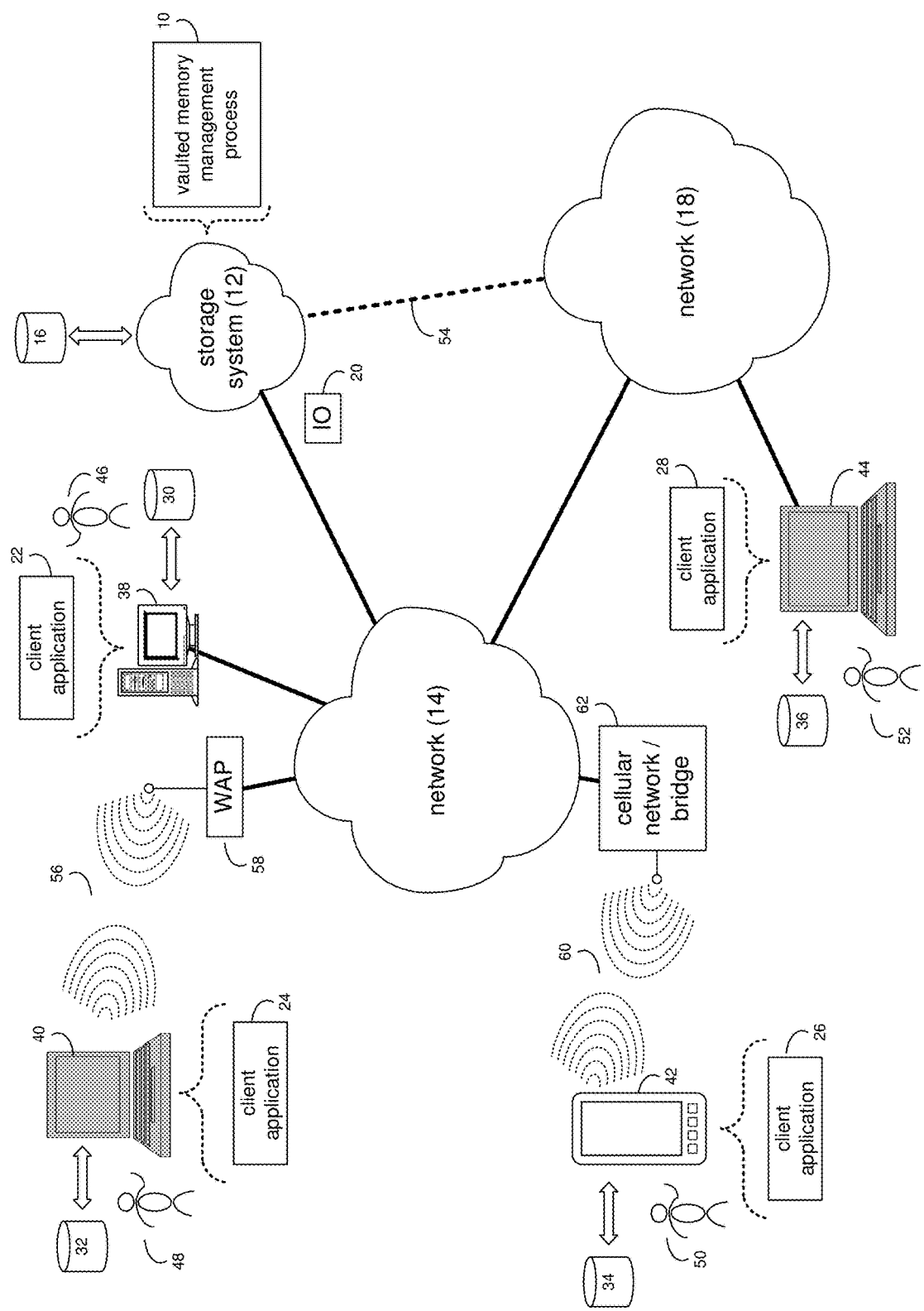
FIG. 1 is an example diagrammatic view of a storage system and a vaulted memory management process coupled to a distributed computing network according to one or more example implementations of the disclosure.

System Overview:

Referring to FIG. 1, there is shown vaulted memory management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of vaulted memory management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of vaulted memory management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
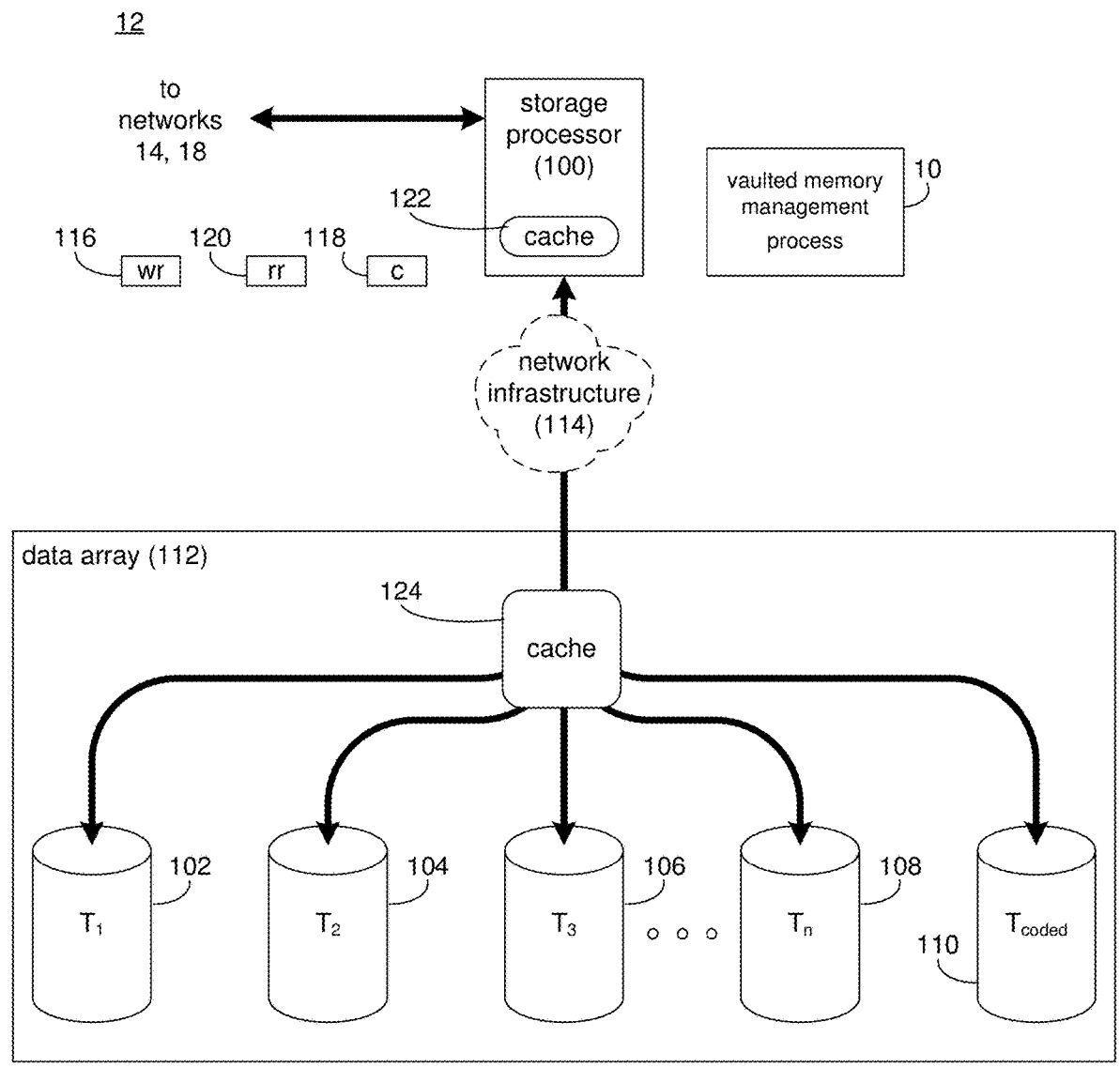
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106,

108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of vaulted memory management process 10. The instruction sets and subroutines of vaulted memory management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of vaulted memory management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of vaulted memory management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of vaulted memory management process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some embodiments, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some embodiments, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Figure 3:
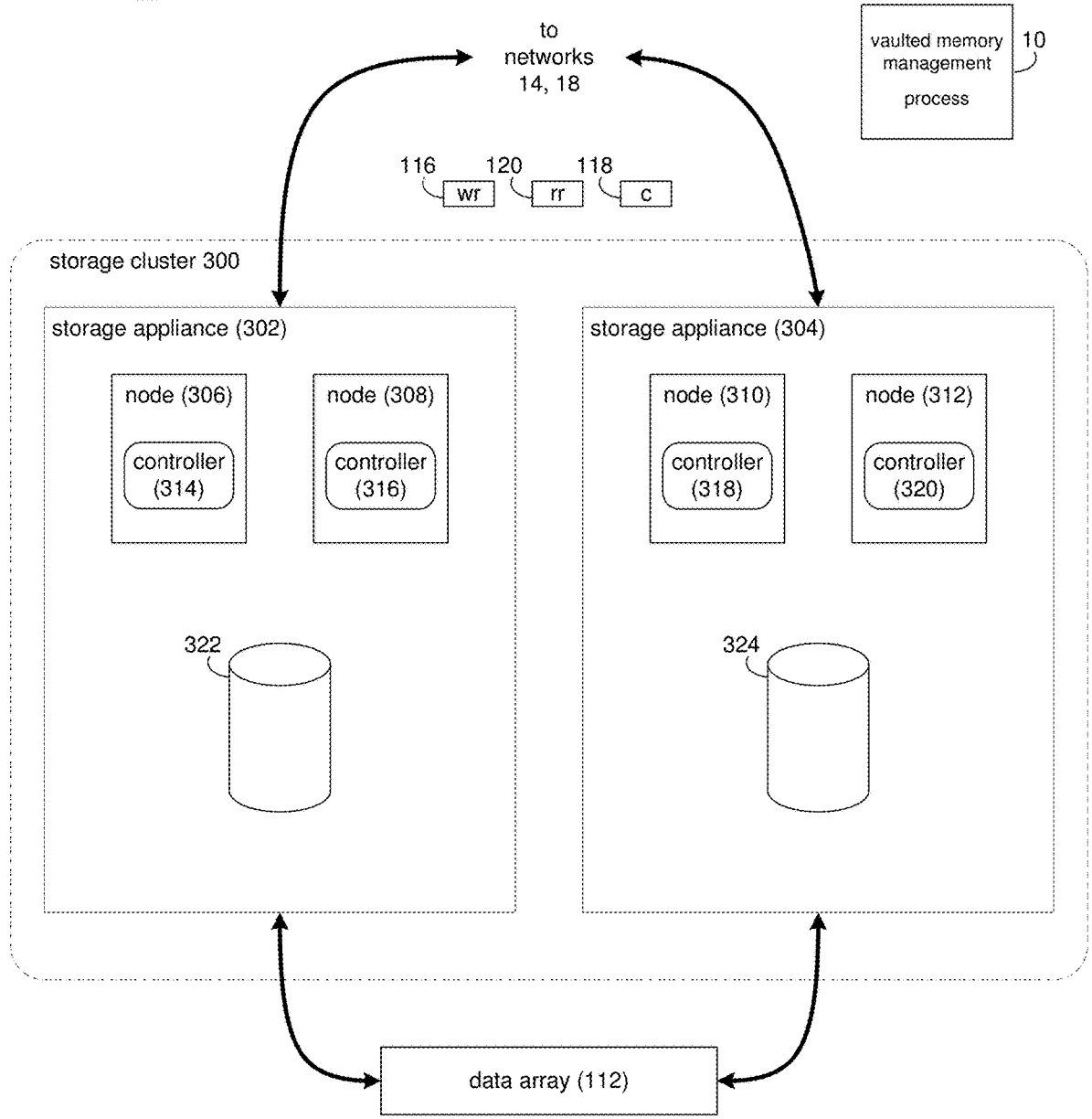
Figure 4:
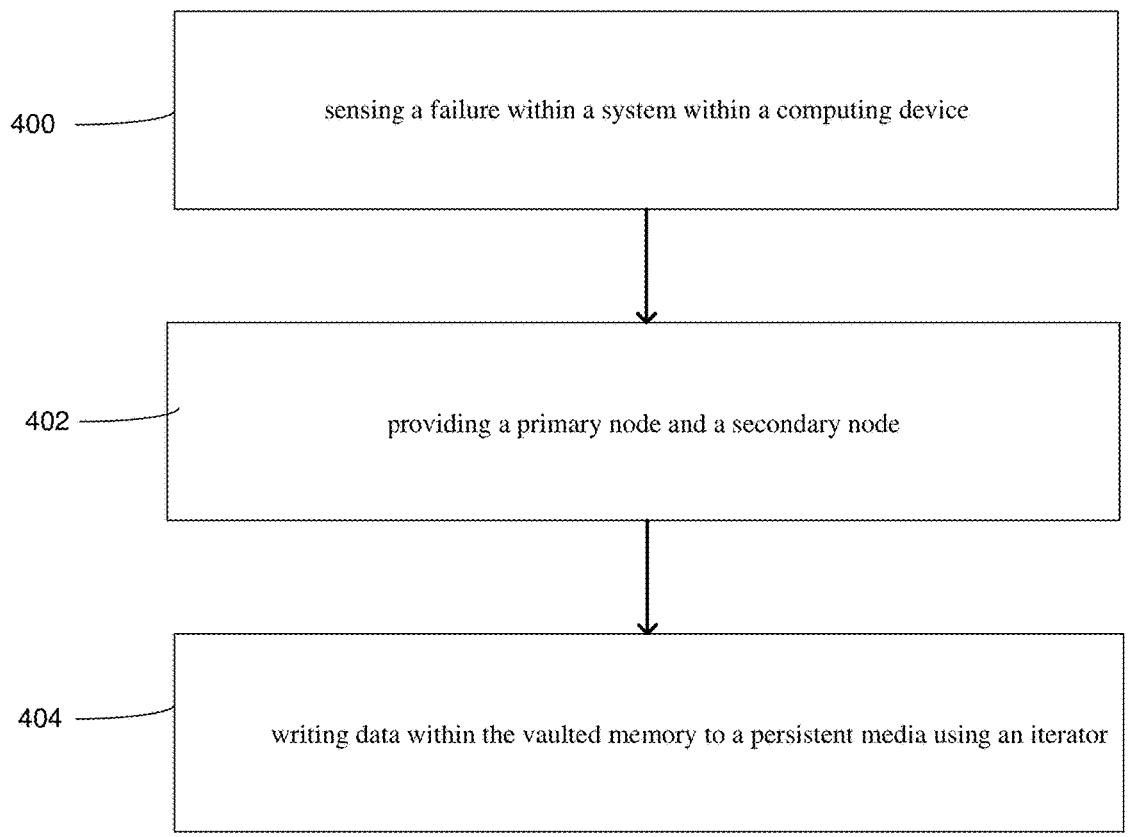
FIG. 4 is an example flowchart of the vaulted memory management process of FIG. 1 according to one or more example implementations of the disclosure.
Figure 5:
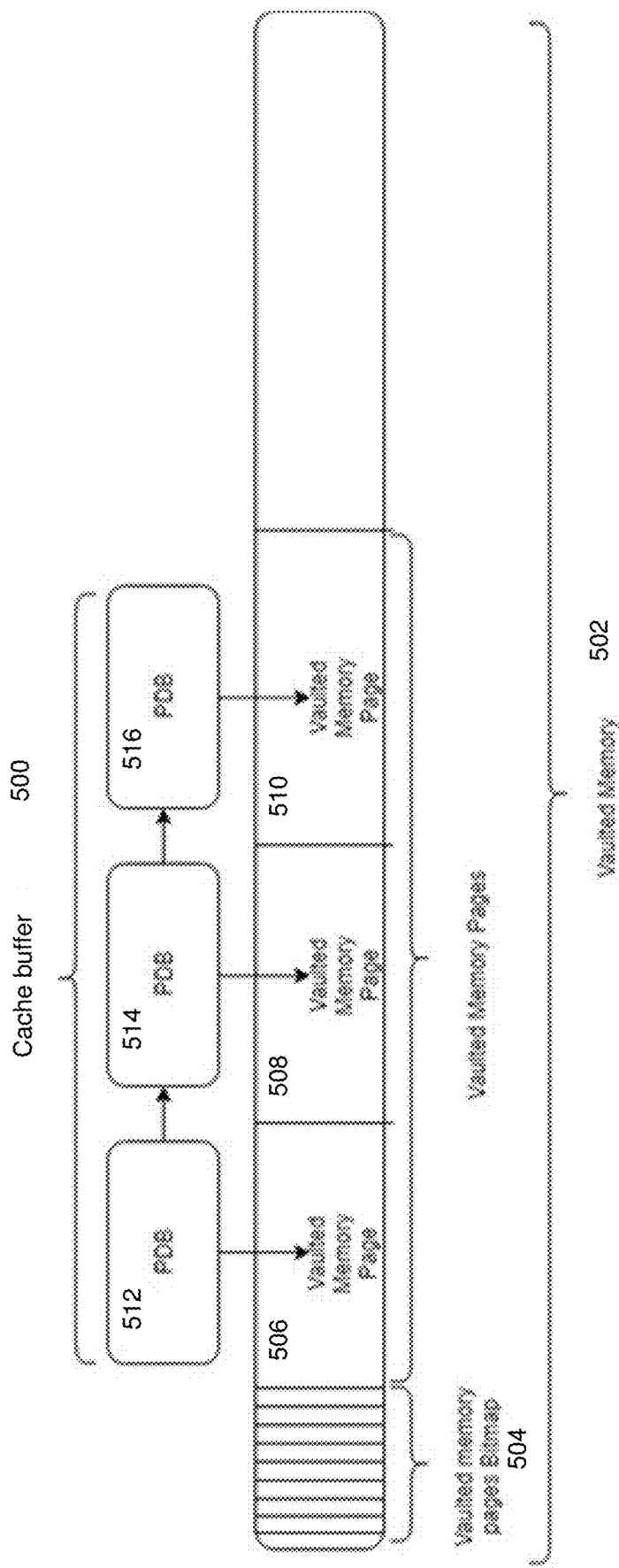
FIGS. 5-7 are example diagrammatic views of the vaulted memory management process of FIG. 1 according to one or more example implementations of the disclosure.

The Storage Cluster:

Referring also to FIG. 3, storage system 12 may include a storage cluster (e.g., storage cluster 300) of storage appliances (e.g., storage appliances 302, 304). A cluster of storage appliances (e.g., storage cluster 300) may generally include a Federation composed of multiple appliances, where each storage appliance (e.g., storage appliances 302, 304) may include a plurality of (e.g., at least two) connected nodes/storage processors (e.g., nodes 306, 308, 310, 312) with shared back-end drives (e.g., data array 112) running a storage stack that communicate over a network. In some embodiments, each node may include one or more storage controllers (e.g., controllers 314, 316, 318, 320) configured for processing host IO operations on one or more volumes (e.g., volumes 322, 324) managed by a storage appliance.

In some embodiments and as will be discussed in greater detail below, each storage appliance may have its own captive storage (e.g., volumes) that are managed by the storage appliance. In some embodiments, a volume managed by one storage appliance may not be accessible from any other storage appliance. For example, volume 322 may be managed by storage appliance 302 and volume 324 may be managed by storage appliance 304. In this example, volume 322 may not be accessible by storage appliance 304 and volume 322 may not be accessible by storage appliance 302.

In some embodiments, each storage appliance (e.g., storage appliances 302, 304) may be communicatively coupled to a back-end storage array (e.g., data array) via various storage protocols (e.g., Small Computer System Interface (SCSI) (iSCSI), Fibre Channel, Non-Volatile Memory Express (NVMe) over Fabric (NVMe-oF), etc.). As is known in the art, NVMe or NVM Express® is a specification defining how host software communicates with non-volatile memory across a PCI Express® (PCIe®) bus. As will be discussed in greater detail below, a storage protocol may generally include standards or protocols for physically connecting and transferring data between computing devices and peripheral devices. In some implementations, a storage protocol path may generally include a hardware and/or software communication link between a computing devices and peripheral devices.

Committing Data to a Persistent Media:

As mentioned above, when it comes to efficiently storing data in light of a failure of a system (e.g., a restart, power disruption, etc.), writing data to a persistent media may be desirable in order back-up the data. A persistent media may utilize a non-volatile random-access memory (NVRAM) or a battery backup random access memory (RAM) in order to back-up the data. More specifically, and in regards to a modern storage cluster, a modern storage cluster may utilize volatile RAM along with data journaling to optimize a write operation latency. However, in this configuration, a node within the RAM may face several challenges, including, but not limited to, not being able to manage an independent cache associated with the RAM and requiring memory duplication and/or extra memory copy. Further, a cache associated with the RAM may not able to set its own policies on managing clean space within the cache associated with the RAM, which may lead to inefficiency issues.

For example, in a NVRAM configuration, a persistent journal method managed in a logged structure may be used to optimize a write operation latency. In this configuration, two nodes within the NVRAM may be mirrored where both nodes may read data from NVRAM, no matter which node logged the data in the NVRAM. Further, for fast access to a cache associated with the NVRAM (e.g., a cache RAM), data pages may be stored in a cache associated with the NVRAM as well. Though, more than one cache associated with the NVRAM may be included where a node within the NVRAM may be configured to be used with a cache associated with the NVRAM. The cache of the first node may be different and separate from the cache of the second node. Within a cache associated with the NVRAM, a volatile copy of a data page may be kept by a node which process an IO request. Specifically, the node may keep the volatile copy of the data page in its own cache. Further, another node may read the data page from the NVRAM on demand and keep the data page in its own cache.

In some embodiments, in regards to how a modern storage cluster with a NVRAM that utilizes a data journal (e.g., a log) optimizes a write operation, data received from a client may be persisted to a journal (e.g., a log) that is located on the NVRAM. In this configuration, a location of the data may be shared with one or more nodes, which may include a processing node and reading node. The processing node may keep data in its own volatile cache associated with the NVRAM. The reading node may be configured to read data from the NVRAM on demand. In terms of persisting the data to a journal (e.g., a log) that is located on the NVRAM, once data is successfully persisted to a persistent media, a storage cluster may take full responsibility for consistency of the data. The storage cluster may also be configured to acknowledge a client. Additionally, asynchronous flushing of the data may occur where the data may be destaged from the log to a final location (i.e., a data store). At that time, journal space may be reclaimed for reuse where the data itself may be marked as clean. When the data is marked as clean, the clean data may become part of a clean cache. Further, the clean data then may be managed by a cache reclaim policy of a cache associated with the NVRAM. One example of a cache reclaim policy may include a last recently used (LRU) policy.

Further, in regards to the log used to optimize a write operation, the log may include log components in some embodiments. The log component may include two persisted object types. First, a page buffers (PB) may be included where the PB may indicate where user data may be written to. Further, the PB may include a fixed page size. Second, a page descriptor (PD) may also be included as a log component. The PD may include a small object allocated for a PB. Further, a PD may reference a corresponding PB. A PD may also include a logical block address (LBA) of data a corresponding PD contains. The LBA may be associated with a client. Additionally, a PD may contain a sequence transaction number (Seq). The Seq may configured to be a numerically growing number that may allow for tracking of a write operation and a dependency and order. A PD may also include a flag and/or other required information.

In some embodiments, a PD may be allocated and written without any reference to user data within a PB to mark an event or dependence (e.g., creating a snapshot) to track one or more correct operations time ordering and dependencies. As such, a number of PDs may be greater (i.e., much more) than a number of PBs. Further, regarding the time ordering and dependencies may occur where two or more writes may be present and it may be desired to determine which write came first (i.e., a write with a lowest sequence number). Further, dependencies may include a snapshot operation invalidation xcopy sub extent. The snapshot operation invalidation xcopy sub extent may be used to determine if a write occurred before or after an operation while also not flushing or cleaning an entry before a first operation is flushed.

In some embodiments, a the data journal may be implemented by persisting a new data page in a PB. However, the data page may not be referenced (i.e., in an unreferenced state), which may result in the data page not existing logically. A PD may then be logged where the PD may reference the persisted PB. At this point, after receiving an acknowledgement for the PD being logged, data may be considered persisted and may be recovered in the event of a failure of a system (e.g., a restart, power disruption, etc.).

In some embodiments, a PD and PB may be maintained in a log component of a log. Within the log component, a ring buffer may be utilized. The ring buffer itself may include a ring of corresponding elements, including a tail (e.g., a tail element) and a head (e.g., a head element). The head element may be configured to include a first empty place in the ring buffer itself for a new write and the tail element may be configured to include the oldest write. When adding a new write to the a ring buffer, an old write near the tail element may be processed and written to a final storage place. As such, a new entry to the ring buffer may be allocated from the head element while space may be reclaimed within the ring buffer itself from the tail element. Further, when an entry in the tail element is flushed and freed, a next entry to the ring buffer may be moved to the tail element. Therefore, utilizing a ring buffer may include advantages such as a simplicity of allocating and/or freeing the head element and/or tail element. Further, the ring buffer may be configured to guarantee a natural time ordering that may be defined by a physical portion of an element within the ring buffer.

In some embodiments, two ring buffers may be utilized, including a PB ring buffer and a PD ring buffer. Regarding a PB ring buffer, the PB ring buffer may occupy the most space on a log. For example, a PB within the PB ring may occupy 4 KB. Regarding a PD ring buffer, a PD ring buffer may occupy less space as compared to the PB-ring despite a number of PDs within the PD ring buffer being larger than a number of PBs in the PB ring buffer. This may be due to the fact that a PD within the PD ring buffer may be a small object.

In some embodiments, the above two mentioned ring buffers (e.g., the PB ring buffer and PD ring buffer) may be utilized with a storage cluster using persistent RAM. In this configuration, the PB ring may include a PB where user data may be written to the persistent RAM. The PB may be in the PB ring may be duplicated in persistent RAM. When the PB is duplicated in the persistent RAM, one or more dirty pages of data may be cached in the RAM where the RAM may be volatile. Further, the PD ring may include a PD, which may represent a small object allocated for a corresponding PB. The PD may be contained in the persistent RAM. The storage cluster using the PB and PD ring buffer may include a Trident storage cluster developed by Dell EMC of Hopkinton, MA.

In some embodiments, a node may be configured to manage an independent cache memory system without extra memory duplication and/or extra memory copy. Further, in this embodiment, a cache of the a cache memory system may have its own policies on managing clean space. For example, the cache of the cache memory system may utilize a PB in the persistent RAM, specifically volatile RAM. Once data within the PB is flushed and a log space is reclaimed, the PB may be copied to the persistent RAM. However, copying a PB may be expensive for a central processing unit (CPU) of a computing system due to the PB having a fixed block size. Additionally or alternatively, once data in the PB is flushed and a log space is reclaimed, the PB may no longer be cached in the cache of the cache memory system. However, the PB may not be released under policies of a cache memory system. As such, multiple read-miss operations may occur, reading from a data-store.

In some embodiments, persistent RAM may be utilized where both a logged structure and a cache page are located in the RAM. In this embodiment, a cache of the cache memory system may point to a dirty page in the logged structure. When a dirty page is cleaned by flushing, it may be removed from the cache of the cache memory system or copied to the RAM. Removing the dirty page from the cache of the cache memory system or copying it to the RAM may both affect performance of the overall system. For example, memory copy may be an expensive operation. Further releasing from a cache should be managed by cache policies such as LRU as opposed to a flushing policy.

The Vaulted Memory Management Process:

Referring to FIGS. 4-7, embodiments according to the present disclosure of vaulted memory management process 10 are shown. Specifically, vaulted memory management process may be used to optimize memory usage and performance of clean and dirty cache in an active/active storage system that utilizes persistent RAM as its journal memory.

In some embodiments, vaulted memory management process 10 may sense 400 a failure within a system within a computing device. The failure may include powering down of the computing device, a power failure of a computing device, etc. (e.g., a restart, power disruption, etc.). The system itself may comprise a cache memory system and a vaulted memory (e.g., vaulted memory 502). Since an amount of data able to be persisted to a persistent media during a system failure (e.g., a restart, power disruption, etc.) may be limited by battery life associated with a battery of a battery backup unit (BBU), content of data on a cache within cache memory system in its entirety may be kept in vaulted memory 502. Further, an amount of data able to be persisted to a persistent media during a system failure (e.g., a restart, power disruption, etc.) may be limited by a desire to not want to separate between a read and a write cache memory, which may avoid the need to copy data an extra time. As to the content of the data within the cache, the data within a cache within cache memory system may include one or more of a clean page and a dirty page. Further, a bitmap may be kept within vaulted memory 502 in order to tell if a page is clean or dirty.

In some embodiments, vaulted memory 502 may comprise a random access memory (RAM) having a plurality of independent persistent areas. Vaulted memory 502 may include a plurality of data within the RAM, a vaulted memory page bitmap (e.g., bitmap 504), a vaulted memory page (e.g., vaulted memory page 506, 508, 510). Further, vaulted memory 502 may be associated with a cache buffer (e.g., cache buffer 500). The cache buffer may include a PB and/or a PD (e.g., PDB 512, 514, 516). The PB and/or PD may be configured to be linked to a vaulted memory page (e.g., vaulted memory page 506, 508, 510) of vaulted memory 502.

In some embodiments, a primary node (e.g., 700) and a secondary node (e.g., 702) may be provided 402 in vaulted memory 502. The primary node (e.g., 700) may occupy a first independent persistent area of the RAM of vaulted memory 502 and the secondary node (e.g., 702) may occupy a second independent persistent area of the RAM of vaulted memory 502. Additionally, data within vaulted memory 502 may include at least one dirty page that may be flushed to the persistent media. Additionally, data within vaulted memory 502 may be written 404 to vaulted memory 502 to a persistent media using an iterator upon a system failure (e.g., a restart, power disruption, etc.). Specifically, the iterator may be run by a platform process to identify a buffer and size of an iteration run before writing 404 to the persistent media. Further, writing 404 data within vaulted memory 502 to the persistent media using an iterator may not require use of non-volatile random access memory (NVRAM) that utilizes a data journal.

In some embodiments, vaulted memory 502 may be defined by a platform process of a platform. The platform process of a platform may be different from a data path process, may manage hardware of a system (e.g., system 12), and may also be used to iterate vaulted memory 502 and write data within vaulted memory 502 to a persistent media upon failure of a system. More specifically, vaulted memory 502 may include a persistent memory configured to be used with a backed-up battery and/or a component (e.g., components 600, 602, 604, 606, 608, 610). When a system failure occurs (e.g., a restart, power disruption, etc.), vaulted memory 502 may be copied on battery to a persistent media using an iterator, which may include copying a component of the component (e.g., components 600, 602, 604, 606, 608, 610) may be iterated.

In some embodiments, a size of vaulted memory 502 may be larger than supported by a BBU. As such, only a portion of vaulted memory 502 may include a dirty page. The dirty page may be persisted to a persistent media in the event of a system failure (e.g., a restart, power disruption, etc.).

In some embodiments, vaulted memory 502 may be configured to manage a PD-ring comprising at least one PD, a dirty cache, and a clean cache. A such, a cache configured for use with vaulted memory 502 may use a page from vaulted memory 502 only.

In some embodiments, an initial address and size of vaulted memory 502 may be received from a platform. The component (e.g., components 600, 602, 604, 606, 608, 610) of vaulted memory 502 may then be partitioned in response to receiving the initial address and size of vaulted memory 502.

In some embodiments, upon a startup of a system, a cache of a cache memory system may allocate space from vaulted memory 502 for a page and a bitmap. Further, a logging service may use vaulted memory 502 to log at least one descriptor (e.g., a PD). Vaulted memory 502 may include a header (e.g., header 612) that may contain a location of the component (e.g., components 600, 602, 604, 606, 608, 610) within vaulted memory 502.

In some embodiments, upon a startup of a system, the component (e.g., components 600, 602, 604, 606, 608, 610) may register itself within vaulted memory 502. Specifically, the component (e.g., components 600, 602, 604, 606, 608, 610) may register whether or not the component (e.g., components 600, 602, 604, 606, 608, 610) includes a bitmap. If a bitmap is included in the component (e.g., components 600, 602, 604, 606, 608, 610), a granularity of the bitmap may also be registered with vaulted memory 502.

In some embodiments, a header (e.g., header 612) of the component (e.g., components 600, 602, 604, 606, 608, 610) may be returned, via an iterator, to vaulted memory 502.

In some embodiments, vaulted memory management process 10 may determine if the component (e.g., components 600, 602, 604, 606, 608, 610) includes a bitmap (e.g., bitmap of component 606, bitmap of component 610). In response to determining the component (e.g., components 600, 602, 604, 606, 608, 610) within vaulted memory 502 includes a bitmap (e.g., bitmap of component 606, bitmap of component 610), vaulted memory management process 10 may determine if the bitmap (e.g., bitmap of component 606, bitmap of component 610) is associated with a dirty page and the dirty page may be iterated. Iterating the dirty page may include returning a size and an address of the bitmap (e.g., bitmap of component 606, bitmap of component 610) to vaulted memory 502.

In some embodiments, a size of the component (e.g., components 600, 602, 604, 606, 608, 610) may be returned, via an iterator, to vaulted memory 502. The size of the component (e.g., components 600, 602, 604, 606, 608, 610) may be returned in the form of the granularity of the bitmap (e.g., bitmap of component 606, bitmap of component 610) that was earlier registered, as described above, upon a system startup with vaulted memory 502. After determining the component (e.g., components 600, 602, 604, 606, 608, 610) within vaulted memory 502 includes a bitmap, vaulted memory process 10 may determine if another component (e.g., components 600, 602, 604, 606, 608, 610) within vaulted memory 502 includes a bitmap.

In some embodiments, if a component (e.g., components 600, 602, 604, 606, 608, 610) includes a bitmap (e.g., bitmap of component 606, bitmap of component 610) associated with a dirty page, the dirty page associated with the bitmap (e.g., bitmap of component 606, bitmap of component 610) may be written to a persistent media. When writing the dirty page associated with the bitmap (e.g., bitmap of component 606, bitmap of component 610) to the persistent media, the component (e.g., components 600, 602, 604, 606, 608, 610)

may be configured to ensure a size of the dirty page does not exceed a size of data that can be copied on battery to the persistent media.

In some embodiments, a bitmap (e.g., bitmap of component 606, bitmap of component 610) may be associated with a dirty page. For example, a bitmap of component 606 may be associated with a first dirty page and bitmap of component 610 may be associated with a second dirty page. Since the first dirty page and the second dirty page may be written to the persistent media, a component (e.g., components 600, 602, 604, 606, 608, 610) may be configured to ensure a size of the first dirty page and a size of the second dirty page do not exceed a size of data that can be copied on battery to the persistent media.

In some embodiments, vaulted memory management process 10 may determine the component (e.g., components 600, 602, 604, 606, 608, 610) does not include a bitmap (e.g., bitmap of component 606, bitmap of component 610). In response, vaulted memory process 502 may return a size and/or an address of the component (e.g., components 600, 602, 604, 606, 608, 610). The size and/or address of the component (e.g., components 600, 602, 604, 606, 608, 610) may be returned to a beginning portion of the component (e.g., components 600, 602, 604, 606, 608, 610).

In some embodiments, a bitmap (e.g., bitmap of component 606, bitmap of component 610) associated with a dirty page may include a dirty bitmap that may be configured to track a dirty space on a data page (e.g., a dirty page). The dirty space on the data page may be tracked with the dirty bitmap using 1 bit per data page.

In some embodiments, a bit of bitmap (e.g., bitmap of component 606, bitmap of component 610) may be shut/turned off at a time designated to clean a cache in order to convert the dirty page to a clean page. At that time, the dirty page converted to a clean page may be added to a release policy of the cache of the cache memory system. Only a dirty page with a dirty bit turned on may be flushed to a persistent media. As such, a dirty page may be moved from a dirty cache to a clean cache by turning off one single bit.

Figure 6:
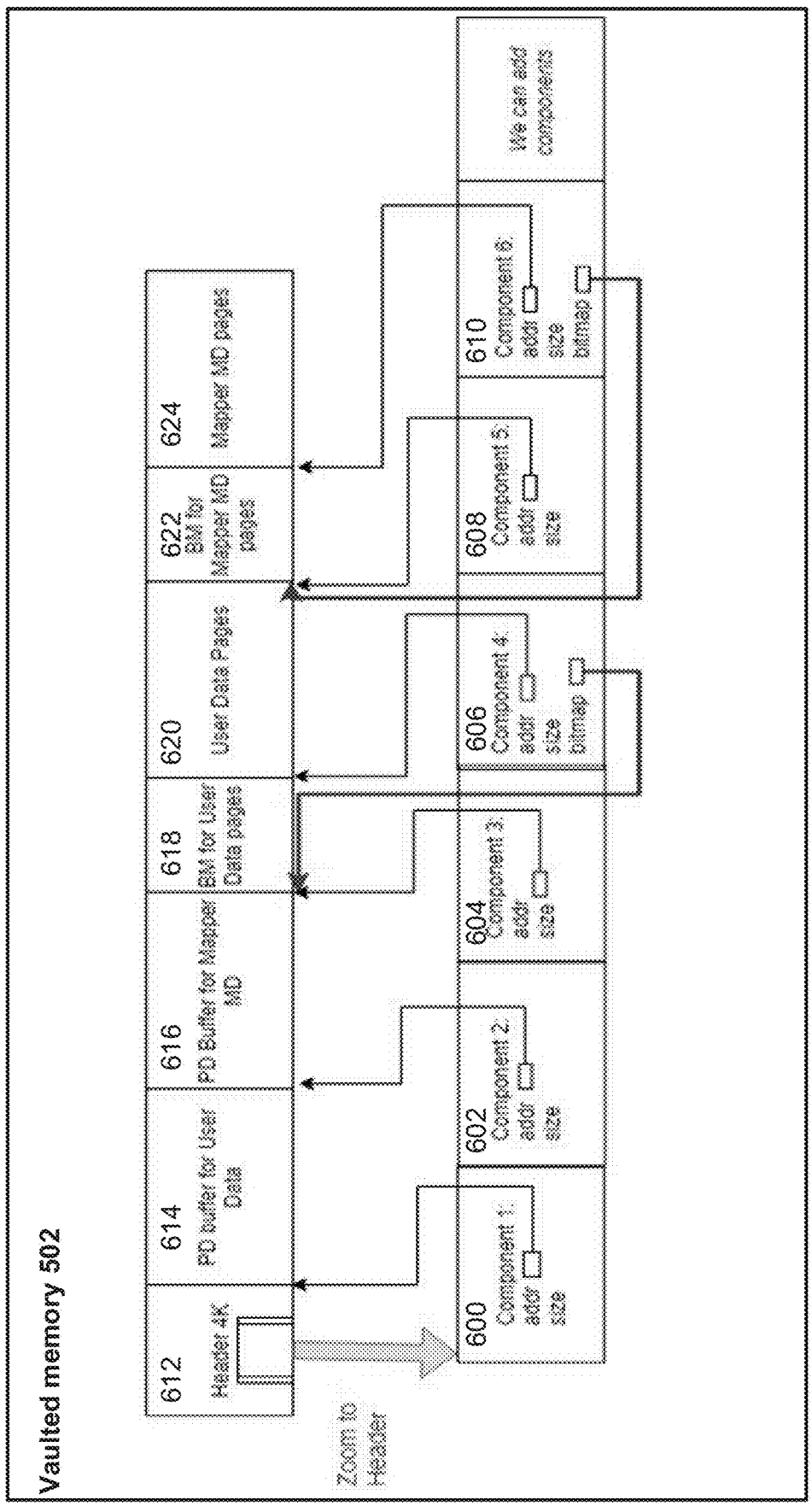

Referring to FIG. 6 in further detail, the component (e.g., components 600, 602, 604, 606, 608, 610) may be mapped to a header, where the header may be zoomed into to display the header contents of vaulted memory 502. For example, component 600 may be mapped to header 612. A component (e.g., components 600, 602, 604, 606, 608, 610) may be mapped to a PD buffer that may include user data. For example, component 602 may be mapped to PD buffer 614. Vaulted memory 502 may include a component mapped to a PD buffer used that may include a mapper for metadata. For example, component 604 may be mapped to PD buffer 616. Vaulted memory 502 may include a component mapped to a bitmap used that may include a user data page. For example, component 604 may be mapped to bitmap 618. Vaulted memory 502 may include a component mapped to a user data page. For example, component 606 may be mapped to user data page 620 within vaulted memory 502. In this configuration, a bitmap associated with component 606 may be mapped to bitmap 618. Vaulted memory 502 may include a component mapped to a bitmap that may include a mapper metadata page. For example, component 608 may be mapped to bitmap 622 used in connection with a mapper for a metadata page. Vaulted memory 502 may include a component mapped to a mapper for a metadata page. For example, component 610 may be mapped to mapper 624. Further, a bitmap associated with component 610 may be mapped to bitmap 622 used in connection with a mapper for a metadata page. Additional components may be added.

Figure 7:
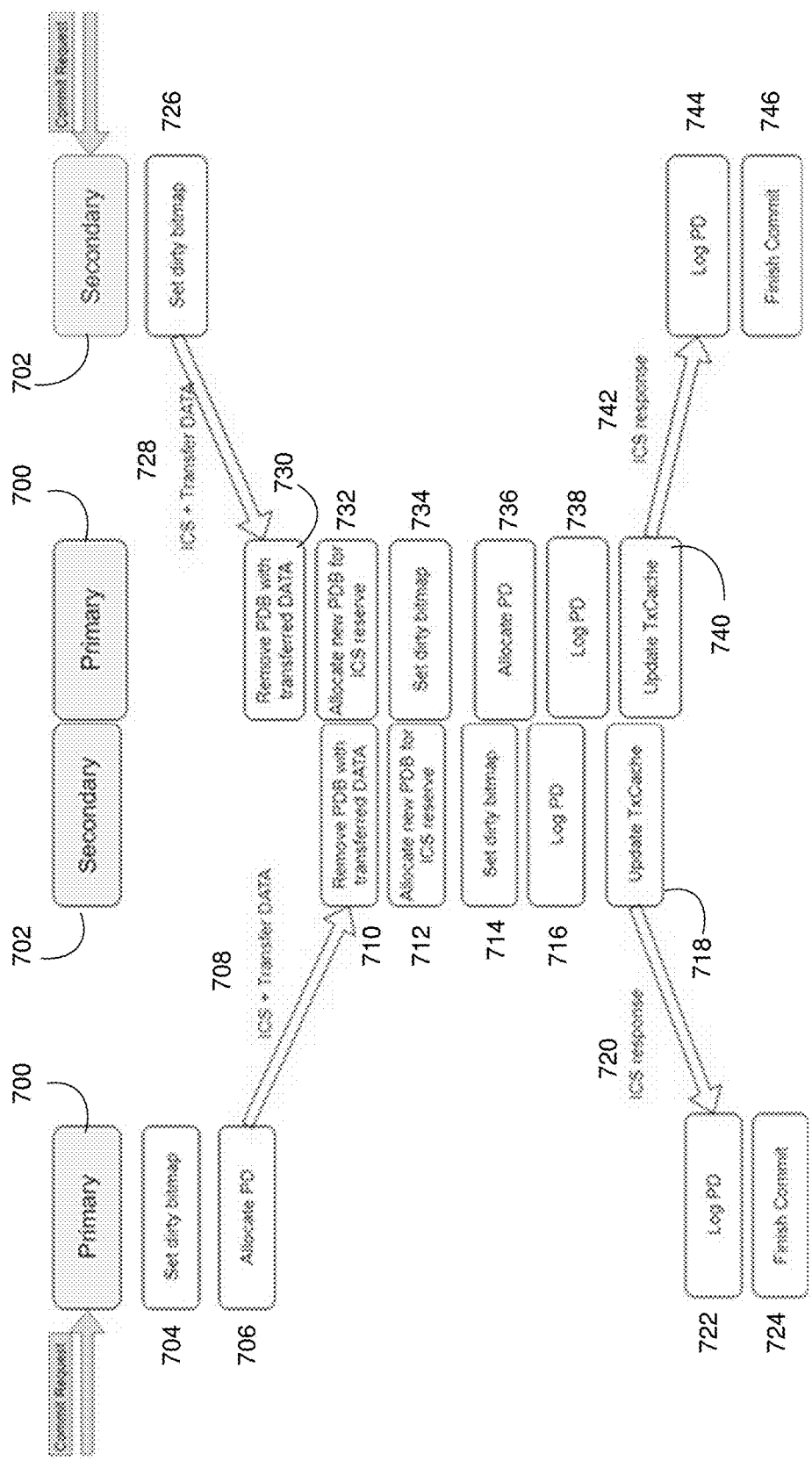

Referring in more detail to FIG. 7, an embodiment of vaulted memory management process 10 is shown where a page may be persisted to a persistent media through a commit process. In this embodiment, an index of a page in a bitmap (e.g., bitmap of component 606, bitmap of component 610) may be an index of the page in vaulted memory 502. Specifically, the index of a page in a bitmap (e.g., bitmap of component 606, bitmap of component 610) may be an index of the page in an allocation buffer. The allocation buffer may include an index of bitmap (e.g., bitmap of component 606, bitmap of component 610) that may represent an address index of a page of a component (e.g., components 600, 602, 604, 606, 608, 610). For example, a component of a page within vaulted memory 502 may have a page size of 4096, an index of the bitmap may be represented as 4096*index in the component of the page.

In some embodiments, the primary node (e.g., primary node 700) may be identified as an initiator node. The initiator node may receive a commit request via the primary node (e.g., primary node 700) to commit data within vaulted memory 502 to a persistent media. Further, the bit of a bitmap (e.g., a bit of a bitmap of component 606, a bit of bitmap of component 610) of the primary node (e.g., primary node 700) may be set 704 where the bit of a bitmap (e.g., a bit of a bitmap of component 606, a bit of bitmap of component 610) may include a dirty bitmap. The dirty bitmap, for example, may be an index of a cache page in a remote node. Additionally, a PD may be allocated 706 via the primary node (e.g., primary node 700). In response, the dirty bitmap and a PD may be transferred 708 via the primary node (e.g., primary node 700) to the secondary node (e.g., secondary node 702 using interconnect services (ICS). The ICS may be responsible for messaging and for remote direct memory access (RDMA). Specifically, the ICS may be and ICS developed by Dell EMC of Hopkinton, MA. In response to transferring 708 the dirty bitmap, the dirty bitmap and PD may be processed, which may include removing 710 a PDB where the PDB may represent a cache data buffer (i.e., may be a descriptor of the data in a cache), allocating 712 a new page descriptor, logging 716 the new PD, and updating 718 the cache of the cache memory system. Further, the new PD may be allocated 712 for ICS reserve.

In some embodiment's, a bit of a bitmap (e.g., a bit of a bitmap of component 606, a bit of bitmap of component 610) within the secondary node (e.g., secondary node 702) may be set 714 after a new PD is allocated 712 by the secondary node (e.g., secondary node 702). The bit of a bitmap (e.g., a bit of a bitmap of component 606, a bit of bitmap of component 610) may include a dirty bitmap.

In some embodiments, an update may be sent 720 to the primary node (e.g., primary node 700) via the secondary node (e.g., secondary node 702) in response to the dirty bitmap and PD being processed. The update may be sent 720 as an ICS response utilizing the above mentioned ICS. The update may include the new PD. Further, the update with the new PD may be logged 722 in the primary node (e.g., primary node 700). The commit process may be finished 724 at that time.

In some embodiments, the secondary node (e.g., secondary node 702) may be identified as an initiator node. The initiator node may receive a commit request via the secondary node (e.g., secondary node 702) to commit data within vaulted memory 502 to a persistent media. Further, the bit of a bitmap (e.g., a bit of a bitmap of component 606, a bit of bitmap of component 610) of the secondary node (e.g., secondary node 702) may be set 726. The bit of a bitmap (e.g., a bit of a bitmap of component 606, a bit of bitmap of component 610) may include a dirty bitmap. The dirty bitmap, for example, may be an index of a cache page in a remote node. The dirty bitmap and a PD may be transferred 728 via the secondary node (e.g., secondary node 702) to the primary node (e.g., primary node 700) via the ICS. In response, the dirty bitmap and PD may be processed, which may include removing 730 the PDB, allocating 732 a new PD, logging 738 the new PD, and updating 740 the cache of the cache memory system. Further, the new PD may be allocated 732 for ICS reserve and/or an additional new PD may also be allocated 736 by the primary node (e.g., primary node 700).

In some embodiments, a bit of a bitmap (e.g., a bit of a bitmap of component 606, a bit of bitmap of component 610) within the primary node (e.g., primary node 700) may be set 734 after the new PD is allocated 732 by the primary node (e.g., primary node 732). The bit of a bitmap (e.g., a bit of a bitmap of component 606, a bit of bitmap of component 610) may include a dirty bitmap.

In some embodiments, an update may be sent 742 to the secondary node (e.g., secondary node 702) via the primary node (e.g., primary node 701) in response to the dirty bitmap and PD being processed. The update may be sent 742 as an ICS response utilizing the above mentioned ICS. Further, the update may include the new PD allocated 732. The update with the new PD may be logged 744 in the secondary node (e.g., secondary node 702). The commit process may be finished 746 at that time.

In some embodiments, a primary node (e.g., primary node 700) and a secondary node (e.g., secondary node 702) may be independent in a cache memory of a cache memory system. As such, a roll-forward and/or a roll-backwards behavior may be defined. The roll-forward and/or roll-backwards behavior may apply where either the primary node (e.g., primary node 700) or the secondary node (e.g., secondary node 702) crashes while attempting to write data to the persistent RAM.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    sensing a failure within a system within a computing device, wherein the system includes a cache memory system and a vaulted memory comprising a random access memory (RAM) having a plurality of independent persistent areas;
    providing a primary node and a secondary node, wherein the primary node occupies a first independent persistent area of the RAM of the vaulted memory and the secondary node occupies a second independent persistent area of the RAM of the vaulted memory; and
    writing data within the vaulted memory to a persistent media using an iterator, wherein the data includes at least one dirty page, and
    wherein writing data within the vaulted memory to the persistent media using the iterator includes:
        flushing the at least one dirty page to the persistent media;
        determining whether at least one of the plurality of components within the vaulted memory includes a bitmap;
        in response to determining the at least one of the plurality of components within the vaulted memory includes the bitmap, determining if the bitmap is associated with a dirty page; and
        iterating, in response to determining the bitmap is associated with the dirty page, the dirty page, wherein iterating the dirty page includes returning a size and an address of the bitmap to the vaulted memory.

2. The computer-implemented method of claim 1, further comprising:
    receiving an initial address and size of the vaulted memory; and
    partitioning a plurality of components within the vaulted memory based upon, at least in part, the received initial address and size of the vaulted memory.

3. The computer-implemented method of claim 1, wherein writing data within the vaulted memory to a persistent media using an iterator further includes:
    determining at least one of the plurality of components does not include a bitmap; and
    returning a size and address of the at least one component of the plurality of components to a beginning portion of the at least one component of the plurality of components.

4. The computer-implemented method of claim 1, further comprising:
    identifying the primary node as an initiator node, wherein the initiator node receives a commit request via the primary node, wherein the commit request includes a request to commit data within the vaulted memory to the persistent media;
    transferring, via the primary node, a dirty bitmap and a page descriptor to a secondary node;
    processing, in response to transferring the dirty bitmap and page descriptor via the secondary node, the dirty bitmap and page descriptor, wherein processing the dirty bitmap and page descriptor includes removing the page descriptor, allocating a new page descriptor, logging the new page descriptor, and updating a cache of the cache memory system;
    sending an update, in response to processing the dirty bitmap and page descriptor, to the primary node via the secondary node, wherein the update includes the new page descriptor; and
    logging the update with the new page descriptor in the primary node.

5. The computer-implemented method of claim 1, further comprising:
    identifying the secondary node as an initiator node, wherein the initiator node receives a commit request via the secondary node, wherein the commit request includes a request to commit data within the vaulted memory to the persistent media;
    transferring, via a secondary node, a dirty bitmap and a page descriptor to the primary node; processing, in response to transferring the dirty bitmap and page descriptor via the primary node, the dirty bitmap and page descriptor, wherein processing the dirty bitmap and page descriptor includes removing the page descriptor, allocating a new page descriptor, logging the new page descriptor with a data offset, wherein the data offset is an index of a remote node, and updating a cache of the cache memory system;

sending an update, in response to processing the dirty bitmap and page descriptor, to the secondary node via the primary node, wherein the update includes the new page descriptor; and logging the update with the new page descriptor in the secondary node.

6. The computer-implemented method of claim 1, wherein writing data within the vaulted memory to a persistent media using an iterator does not require use of non-volatile random access memory (NVRAM) that utilizes a data journal.

7. A computer program product residing on a non-transitory computer readable medium having a plurality of instructions stored thereon which, when executed by a processor, cause the processor to perform operations comprising:

sensing a failure within a system within a computing device, wherein the system includes a cache memory system and a vaulted memory comprising a random access memory (RAM) having a plurality of independent persistent areas;

providing a primary node and a secondary node, wherein the primary node occupies a first independent persistent area of the RAM of the vaulted memory and the secondary node occupies a second independent persistent area of the RAM of the vaulted memory; and writing data within the vaulted memory to a persistent media using an iterator, wherein the data includes at least one dirty page, and wherein writing data within the vaulted memory to the persistent media using the iterator includes:
flushing the at least one dirty page to the persistent media;
determining whether at least one of the plurality of components within the vaulted memory includes a bitmap;
in response to determining the at least one of the plurality of components within the vaulted memory includes the bitmap, determining if the bitmap is associated with a dirty page; and
iterating, in response to determining the bitmap is associated with the dirty page, the dirty page, wherein iterating the dirty page includes returning a size and an address of the bitmap to the vaulted memory.

8. The computer program product of claim 7, further comprising:
receiving an initial address and size of the vaulted memory; and
partitioning a plurality of components within the vaulted memory based upon, at least in part, the received initial address and size of the vaulted memory.

9. The computer program product of claim 7, wherein writing data within the vaulted memory to a persistent media using an iterator further includes:
determining at least one of the plurality of components does not include a bitmap; and
returning a size and address of the at least one component of the plurality of components to a beginning portion of the at least one component of the plurality of components.

10. The computer program product of claim 7, further comprising:
identifying the primary node as an initiator node, wherein the initiator node receives a commit request via the primary node, wherein the commit request includes a request to commit data within the vaulted memory to the persistent media; transferring, via the primary node, a dirty bitmap and a page descriptor to a secondary node;
processing, in response to transferring the dirty bitmap and page descriptor via the secondary node, the dirty bitmap and page descriptor, wherein processing the dirty bitmap and page descriptor includes removing the page descriptor, allocating a new page descriptor, logging the new page descriptor, and updating a cache of the cache memory system;
sending an update, in response to processing the dirty bitmap and page descriptor, to the primary node via the secondary node, wherein the update includes the new page descriptor; and
logging the update with the new page descriptor in the primary node.

11. The computer program product of claim 7, further comprising:
identifying the secondary node as an initiator node, wherein the initiator node receives a commit request via the secondary node, wherein the commit request includes a request to commit data within the vaulted memory to the persistent media; transferring, via a secondary node, a dirty bitmap and a page descriptor to the primary node;
processing, in response to transferring the dirty bitmap and page descriptor via the primary node, the dirty bitmap and page descriptor, wherein processing the dirty bitmap and page descriptor includes removing the page descriptor, allocating a new page descriptor, logging the new page descriptor with a data offset, wherein the data offset is an index of a remote node, and updating a cache of the cache memory system;
sending an update, in response to processing the dirty bitmap and page descriptor, to the secondary node via the primary node, wherein the update includes the new page descriptor; and
logging the update with the new page descriptor in the secondary node.

12. The computer program product of claim 7, wherein writing data within the vaulted memory to a persistent media using an iterator does not require use of non-volatile random access memory (NVRAM) that utilizes a data journal.

13. A computing system comprising:
a memory; and
a processor configured to sense a failure within a system within a computing device, wherein the system includes a cache memory system and a vaulted memory comprising a random access memory (RAM) having a plurality of independent persistent areas, wherein the processor is further configured to provide a primary node and a secondary node, wherein the primary node occupies a first independent persistent area of the RAM of the vaulted memory and the secondary node occupies a second independent persistent area of the RAM of the vaulted memory, and wherein the processor is further configured to write data within the vaulted memory to a persistent media using an iterator, wherein the data includes at least one dirty page, and wherein writing data within the vaulted memory to the persistent media using the iterator includes:
- flushing the at least one dirty page to the persistent media,
- determining whether at least one of the plurality of components within the vaulted memory includes a bitmap,
- in response to determining the at least one of the plurality of components within the vaulted memory includes the bitmap, determining if the bitmap is associated with a dirty page, and
- iterating, in response to determining the bitmap is associated with the dirty page, the dirty page, wherein iterating the dirty page includes returning a size and an address of the bitmap to the vaulted memory.

14. The computing system of claim 13, wherein the process is further configured to:
- receive an initial address and size of the vaulted memory; and
- partition a plurality of components within the vaulted memory based upon, at least in part, the received initial address and size of the vaulted memory.

15. The computing system of claim 13, wherein writing data within the vaulted memory to a persistent media using an iterator further includes:
- determining at least one of the plurality of components does not include a bitmap; and
- returning a size and address of the at least one component of the plurality of components to a beginning portion of the at least one component of the plurality of components.

16. The computing system of claim 13, wherein the processor is further configured to:
- identify the primary node as an initiator node, wherein the initiator node receives a commit request via the primary node, wherein the commit request includes a request to commit data within the vaulted memory to the persistent media;
- transfer, via the primary node, a dirty bitmap and a page descriptor to a secondary node; process, in response to transferring the dirty bitmap and page descriptor via the secondary node, the dirty bitmap and page descriptor, wherein processing the dirty bitmap and page descriptor includes removing the page descriptor, allocating a new page descriptor, logging the new page descriptor, and updating a cache of the cache memory system;
- send an update, in response to processing the dirty bitmap and page descriptor, to the primary node via the secondary node, wherein the update includes the new page descriptor; and
- log the update with the new page descriptor in the primary node.

17. The computing system of claim 13, wherein the processor is further configured to:
- identify the secondary node as an initiator node, wherein the initiator node receives a commit request via the secondary node, wherein the commit request includes a request to commit data within the vaulted memory to the persistent media;
- transfer, via a secondary node, a dirty bitmap and a page descriptor to the primary node; process, in response to transferring the dirty bitmap and page descriptor via the primary node, the dirty bitmap and page descriptor, wherein processing the dirty bitmap and page descriptor includes removing the page descriptor, allocating a new page descriptor, logging the new page descriptor with a data offset, wherein the data offset is an index of a remote node, and updating a cache of the cache memory system;
- send an update, in response to processing the dirty bitmap and page descriptor, to the secondary node via the primary node, wherein the update includes the new page descriptor; and
- log the update with the new page descriptor in the secondary node.

18. The computing system of claim 13, wherein writing data within the vaulted memory to a persistent media using an iterator does not require use of non-volatile random access memory (NVRAM) that utilizes a data journal.

* * * * *